United States Patent [19]

Kinoshita et al.

[11] Patent Number: 4,471,443
[45] Date of Patent: Sep. 11, 1984

[54] COMPENSATION METHOD AND APPARATUS FOR THERMAL DISPLACEMENT

[75] Inventors: Mitsuo Kinoshita, Hachioji; Hiroshi Araki, Hino, both of Japan

[73] Assignee: Fanuc Limited, Tokyo, Japan

[21] Appl. No.: 334,929

[22] Filed: Dec. 28, 1981

[30] Foreign Application Priority Data

Dec. 30, 1980 [JP] Japan ................ 55-186738

[51] Int. Cl.³ ............................ G05B 19/23
[52] U.S. Cl. ................... 364/474; 364/176; 364/170; 318/634; 318/572
[58] Field of Search ............. 318/572, 632, 634; 364/170, 191, 192, 193, 474, 475, 513, 176

[56] References Cited

U.S. PATENT DOCUMENTS

| | | | |
|---|---|---|---|
| 3,412,270 | 11/1968 | Wacek | 310/66 |
| 3,579,073 | 5/1971 | Johnstone et al. | 318/634 |
| 3,672,246 | 6/1972 | Prewett, Jr. et al. | 318/634 |
| 3,917,930 | 11/1975 | Davey et al. | 364/176 |
| 4,011,437 | 3/1977 | Hohn | 364/192 |
| 4,099,113 | 7/1978 | Hayashi | 318/632 |
| 4,150,326 | 4/1979 | Engelberger et al. | 318/568 |
| 4,214,191 | 7/1980 | Watanabe et al. | 318/634 |
| 4,362,977 | 12/1982 | Evans et al. | 318/632 |
| 4,370,721 | 1/1983 | Berenberg et al. | 318/572 |

Primary Examiner—Jerry Smith
Assistant Examiner—John R. Lastova
Attorney, Agent, or Firm—Staas & Halsey

[57] ABSTRACT

A method and apparatus used to compensate for thermal displacement and to correct a positional error caused by the thermally induced displacement of a spindle positioned in response to a numerical control system. The amount of thermally induced displacement of the spindle, at a predetermined point in time after application of electric power to the machine tool, is stored in a memory. When the spindle is to be positioned in response to numerical control data, the commanded amount of spindle movement is compensated by using the amount of thermally induced displacement stored in the memory, and the spindle is then positioned on the basis of the compensated commanded amount of movement.

9 Claims, 5 Drawing Figures

COMPENSATION METHOD AND APPARATUS FOR THERMAL DISPLACEMENT

BACKGROUND OF THE INVENTION

This invention relates to a method and apparatus used to compensate for thermal displacement. More particularly, the invention relates to a method and apparatus which enable a spindle positioning error attributed to thermally induced displacement to be compensated for in a simple manner.

In a machining center of the like a spindle holding a tool is, rotated at high speed and is at the same time, moved toward a workpiece along the Z-axis to position the tool with respect to the workpiece. The workpiece, on the other hand, is transported relative to the spindle along the X- and Y-axes so that it may be machined by the tool into the shape specified by the machining program. It is obvious then, that any positional error along the Z-axis will make it impossible to achieve a high degree of machining accuracy.

In machine tools of the foregoing type a DC motor is employed to rotate the spindle. In DC motor structures an armature winding is wound on approximately the central portion of a spindle, and a field winding for generating a magnetic flux is disposed around the armature winding. When the spindle is rotated the armature and field windings produce heat, as do the bearings supporting the spindle. The total amount of such heat is enough to cause as much as 40 to 50 microns of spindle elongation, the result being a decline in positional accuracy along the Z-axis. Until now highly precise machining has not been possible because of such displacement along the Z-axis.

BRIEF SUMMARY OF THE INVENTION

Accordingly, an object of the present invention is to provide a method and apparatus which make it possible to compensate for a positional error caused by the thermally induced displacement of a spindle or other movable element of a machine tool.

Another object of the present invention is to provide a compensation method and apparatus for thermally induced displacement that enable a workpiece to be machined to a very high precision.

Other features and advantages of the invention will be apparent from the following description taken in conjunction with the accompanying drawings.

DESCRIPTION OF THE PREFERRED EMBODIMENTS

Figure 1:
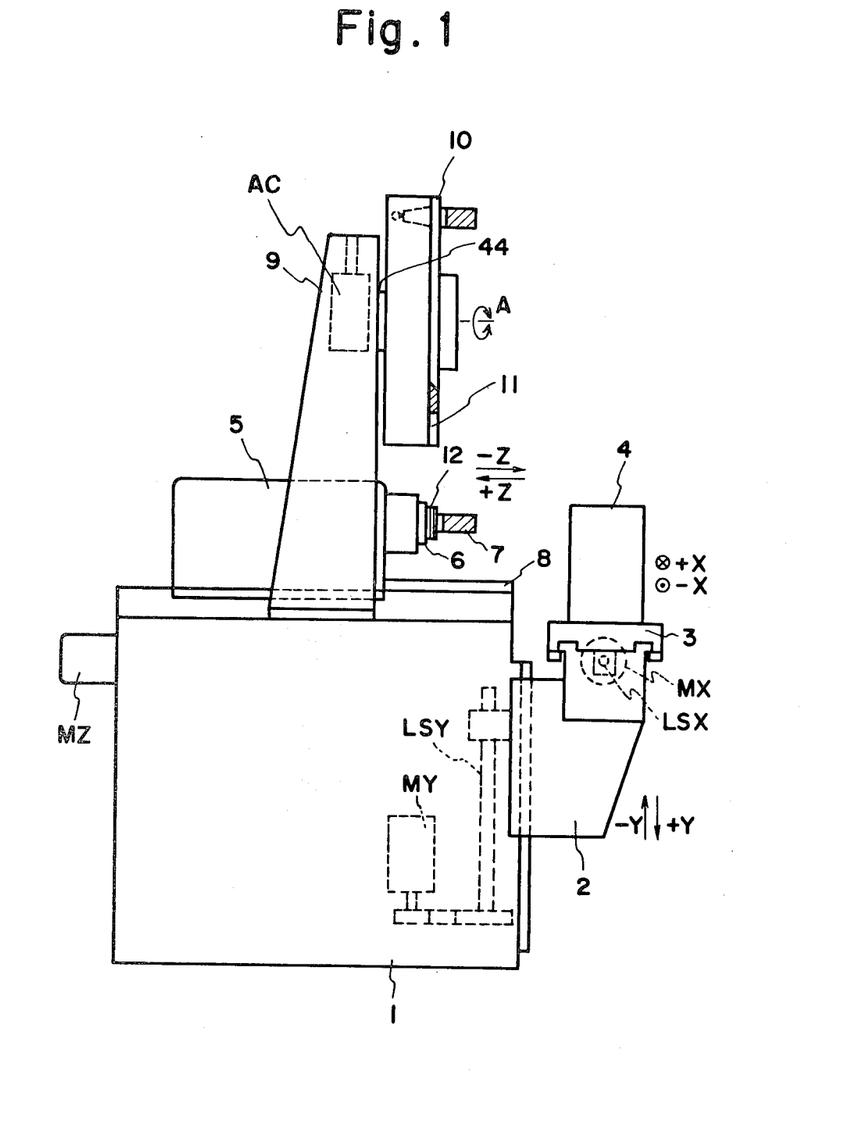
FIG. 1 is a side view of a machine tool to which the present invention may be applied.

The machine tool illustrated in FIG. 1 includes a column 1 and a knee 2. The knee 2 is capable of being transported vertically along the column 1, namely along the Y-axis, by means of a Y-axis feed motor MY and feed screw LSY. A table 3 is carried on the knee 2 and is capable of being transported back and forth along the knee 2 (perpendicular to the plane of the drawing), namely along the X-axis, by an x-axis feed motor MX and feed screw LSX. The table 3 carries a workpiece 4. Numeral 5 denotes a headstock having a spindle 6 extending along the Z-axis which is perpendicular to both the X- and Y-axes, the spindle 6 is holding a spindle tool 7 in the illustration. The column 1 is provided with a horizontal rail 8 on which the headstock 5 is capable of being transported in the Z-axis direction by a Z-axis feed motor MZ which rotates a feed screw, not shown.

Integrated with the column 1 is a vertical column 9 which supports a tool magazine 10 of the rotary type by means of an support shaft 44. The tool magazine 10, driven by a air cylinder AC, is adapted for movement at right angles to the spindle 6, namely along the Y-axis, and, for rotational movement in the direction of arrow A about the support shaft 44. Formed along the entire circumferential edge of the tool magazine 10 are a plurality of equally spaced-apart receptacles 11 each for holding a tool parallel to the spindle 6. In FIG. 1, the receptacle at the lowermost end of the tool magazine 10 is not holding a tool and is located immediately above the tool 7 mounted in the spindle 6. The vacant receptacle 11 can be mated with a retention groove 12 on the tool 7 by lowering the tool magazine 10 to a predetermined distance in the +Y direction. Then, by transporting the headstock 5 in the +Z direction, the tool 7 can be withdrawn from the spindle 6 while being retained in the receptacle 11. If the magazine 10 is now rotated to bring the next receptacle into position opposite the spindle 6, since the headstock 5 is in retracted, the tool being held by said receptacle will be coaxially aligned with the spindle 6. Moving the headstock 5 a predetermined distance in the −Z direction under these conditions will now mate the spindle 6 with the new tool. The tool change is completed by raising the tool magazine 10 in the −Y direction, leaving the new tool mounted in the spindle 6. The spindle 6 may now be moved toward the workpiece 4, namely in the −Z direction, by means of the headstock 5 to position the tool 7 relative to the workpiece which, when moved in the X and Y directions, will be machined by the tool to the prescribed specifications.

Figure 2:
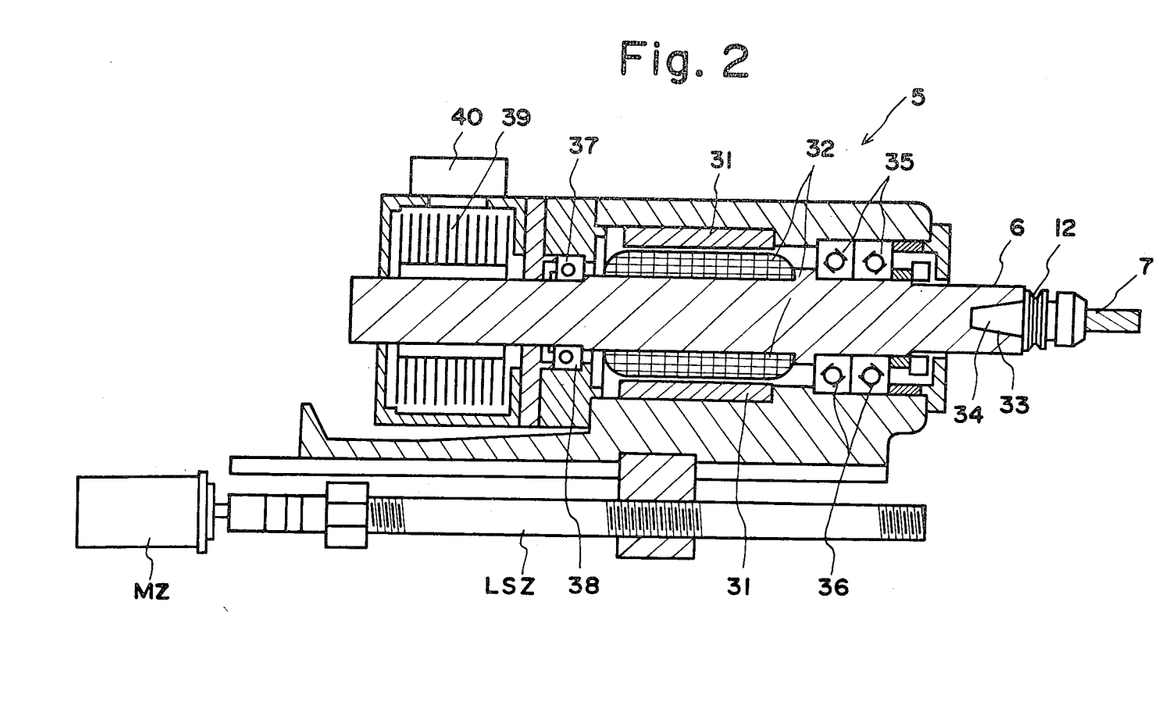
FIG. 2 is a longitudinal sectional view of a headstock provided on the machine tool of FIG. 1.
Figure 3:
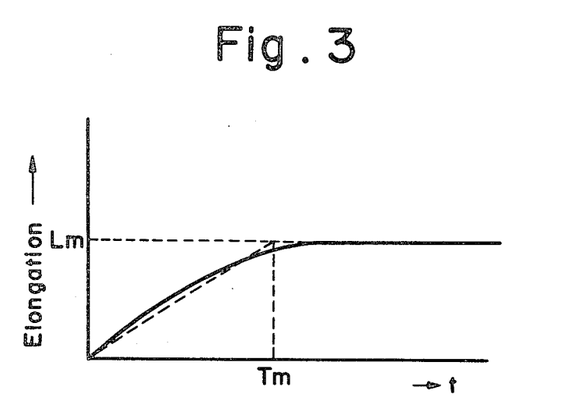
FIG. 3 is a graph showing the relationship between spindle elongation and time.

FIG. 2 is a longitudinal sectional view showing the headstock 5 in greater detail. The headstock 5 can be transported to both the left and right (along the Z-axis) in FIG. 2 by the motor MZ which drives the feed screw LSZ. Provided within the headstock proper is a field winding 31, while an armature winding 32 is wound around the outer periphery of the spindle 6. The field winding 31 and armature winding 32 constitute a DC spindle motor, the armature shaft and the spindle 6 being fabricated from the same member. The forward end of the spindle 6 has a tapered bore 33, as is well known in the art, and the holder 34 of the tool 7 has a tapered surface which mates with the tapered bore 33. The spindle 6, supported by bearings 35 through 38, is provided with heat-dissipating fins 39 which are cooled by a fan driven by a motor 40. It will be appreciated that a considerable amount of heat is generated when the spindle is driven since the armature winding 32 is wound on the outer periphery of the spindle 6. Once power is applied to the machine, the heat attributed to rotation of the spindle causes the spindle to elongate exponentially with the passage of time, as depicted by the solid line in FIG. 3. The maximum displacement due to such heat is indicated at $L_m$ and has a magnitude of from 40 to 50 microns. This will occur at time $T_m$ if a straight line is used to approximate the exponential curve.

Figure 4:
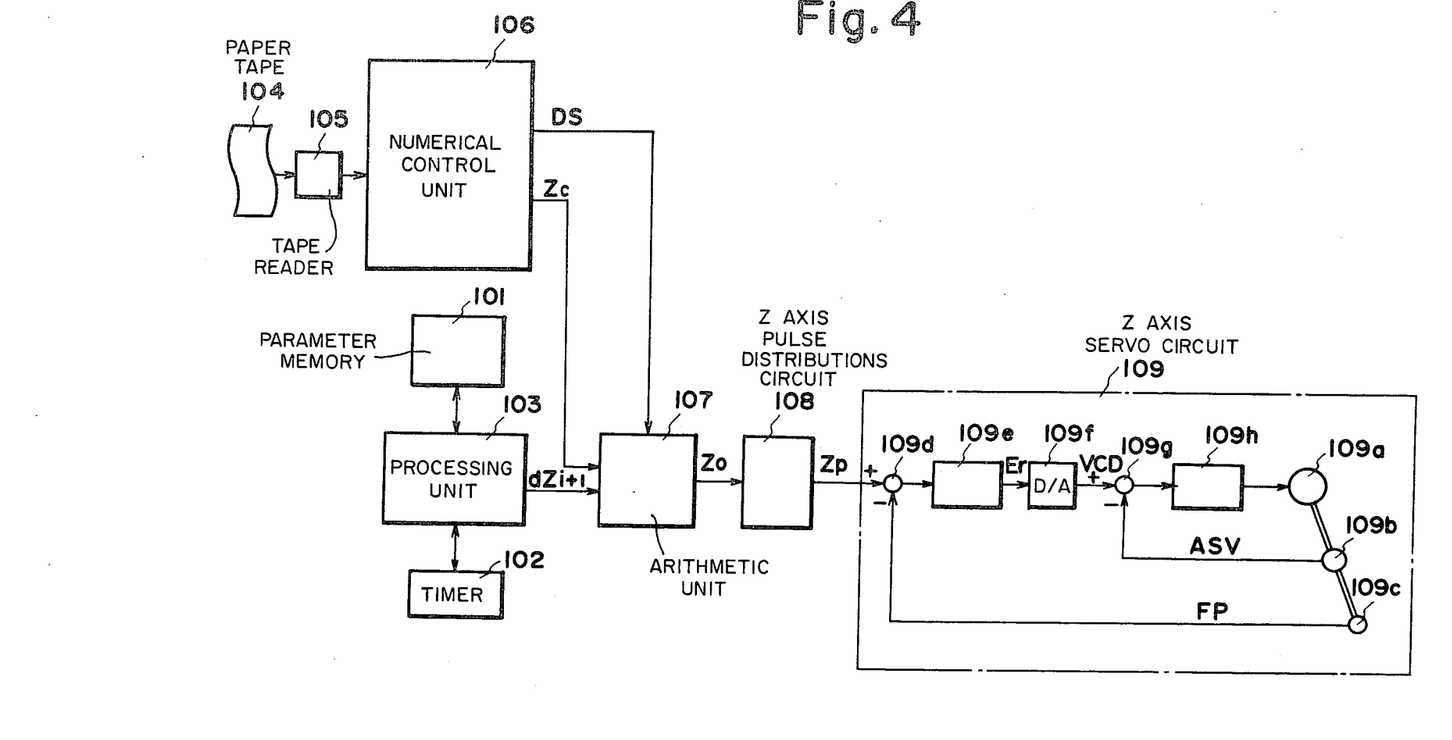
FIG. 4 is a block diagram illustrating a first embodiment of the compensation apparatus according to the present invention.

Reference will now be had to FIG. 4 to describe an apparatus for practicing a method of compensating for the thermally induced displacement according to the present invention. In FIG. 4, numeral 101 denotes a parameter memory for storing the parameters $L_m$ and $T_m$, namely the maximum displacement due to heat and the time at which the maximum displacement occurs, respectively. A timer 102 is set to deliver a pulse at a certain time $t_i$ following the application of electric power to the machine. The pulse is applied to a processing unit 103 which is adapted to compute spindle elongation $dZ_{i+1}$ between the time $t_i$ and a subsequent point in time $t_{i+1}$. More specifically, the processing unit 103, using the time $t_{i+1}$ and the parameters $L_m$, $T_m$, performs the following arithmetic operation, expressed by Eq. 1, at predetermined time intervals $\Delta t$:

$$\Delta Z_{i+1} = \frac{L_m}{T_m} \cdot t_{i+1} \quad (1)$$

thereby computing the spindle elongation $\Delta Z_{i+1}$ at time $t_{i+1}$. Then, using the aforesaid value of $\Delta Z_{i+1}$ as well as the spindle elongation $\Delta Z_i$ at time $t_i$ which is earlier than $t_{i+1}$ by the time interval $\Delta t$, the processing unit 103 performs the operation:

$$dZ_{i+1} = \Delta Z_{i+1} - \Delta Z_i \quad (2)$$

thereby deriving the elongation $dZ_{i+1}$ which has occurred between the points in time $t_i$ and $t_{i+1}$. The processing unit 103 stores the value $\Delta Z_{i+1}$ in a built-in memory and produces a signal which is indicative of the value $dZ_{i+1}$.

Numeral 104 denotes a paper tape which bears NC command data in punched form. The data on the paper tape 104 is read by a tape reader 105 connected to a numerical control unit 106. The latter issues a movement command as well as a sign DS that are read in from the paper tape 104 by the tape reader 105. In this case the amount of commanded movement is $Z_c$ along the Z-axis. The command $Z_c$, the sign DS, and the value $dZ_{i+1}$ from the processing unit 103 are applied to an arithmetic circuit 107 which adds or subtracts the values of $Z_c$ and $dZ_{i+1}$ in accordance with the sign of $Z_c$, namely in accordance with the direction of movement along the Z-axis. Thus subtraction $(Z_c - dZ_{i+1})$ is performed when the sign of $Z_c$ is positive (DS=logical "1"), and addition $(Z_c + dZ_{i+1})$ is performed when the sign of $Z_c$ is negative (DC=logical "0"). The arithmetic circuit 107 produces a signal $Z_o$ which is indicative of the result of the addition or the subtraction operation. The signal $Z_o$ is applied to a Z-axis pulse distributing circuit 108 which performs a pulse distribution operation on the basis of $Z_o$, generating pulses $Z_p$ which serve as command pulses. These command pulses enter a Z-axis servo circuit 109.

The Z-axis servo circuit 109 includes a Z-axis feed motor 109a, which corresponds to the motor MZ shown in FIG. 2; a speed sensor 109b, such as a tachogenerator, for producing an actual speed signal voltage ASV which is a function of the actual speed of motor 109a; a pulse coder 109c for generating single feedback pulse FP each time motor 109a rotates by a predetermined angle; an arithmetic circuit 109d for computing the difference $E_r$ between the number of command pulses $Z_p$ and the number of feedback pulses FP; an error register 109e for storing the computed difference $E_r$; a digital-to-analog converter 109f for generating an analog voltage which is proportional to the contents of error register 109e which is proportional to the difference $E_r$, the analog voltage serving as a speed command voltage VCD; an arithmetic circuit 109g for computing the difference between the speed command voltage VCD and the actual speed voltage ASV; and a speed control circuit 109h which responds to the signal from the arithmetic circuit 109g and controls the speed of motor 109a.

In operation, processing unit 103 uses Eqs. 1 and 2 to compute the spindle elongation $dZ_{i+1}$ caused by the thermal displacement which occurs between time $t_i$, namely a point in time following power-up, and time $t_{i+1}$. The arithmetic circuit 107 receives the commanded movement $Z_c$ from the numerical control unit 106 as well as the elongation value $dZ_{i+1}$ and, through the addition or subtraction operation described above, compensates the value of $Z_c$ by the value $dZ_{i+1}$ to produce the compensated value $Z_o$ which is sent to the pulse distributing circuit 108. As a result, the pulse distributing circuit 108 produces command pulses $Z_p$ of a number corresponding to the value $Z_o$, these pulses being applied to the Z-axis servo circuit 109 which functions in the manner described above to correct, in accordance with the amount of thermally induced displacement, the amount by which the motor 109a is rotated.

Figure 5:
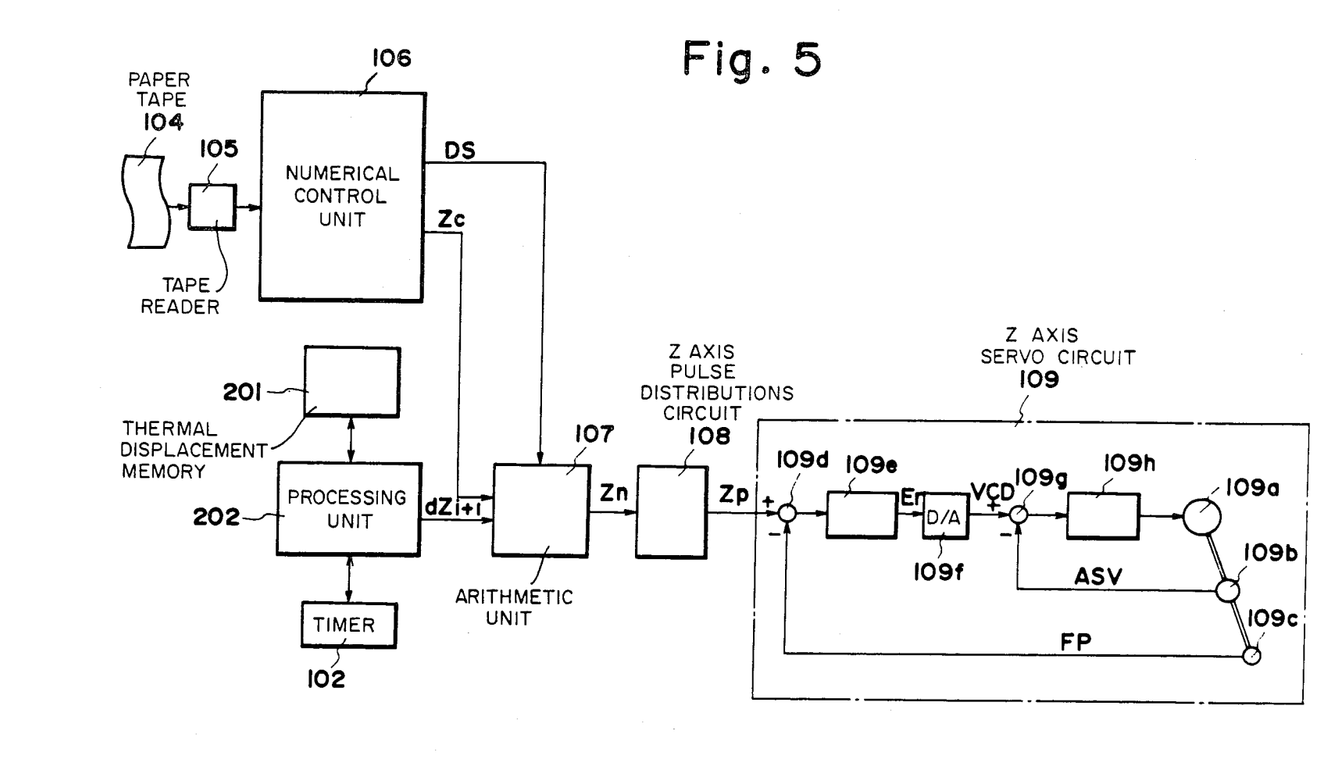
FIG. 5 is a block diagram illustrating a second embodiment of the compensation apparatus according to the present invention.
Figure 6:
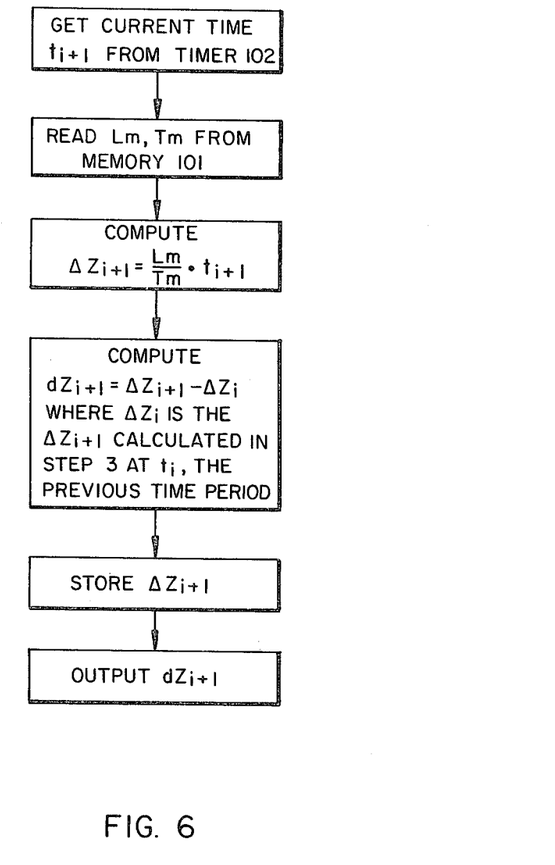

A second embodiment of an apparatus for practicing the method of the present invention is shown in FIG. 5, wherein portions identical with those of FIG. 4 are designated by like reference characters. In FIG. 5, numeral 201 denotes a thermal displacement memory for storing thermally induced displacement $\Delta Z_{i+1}$ ($i=0, 1, 2, \ldots$) of the spindle at each of a plurality of points in time $t_{i+1}$ ($i=0, 1, 2, \ldots$) following power-up. Numeral 202 denotes a processing unit which, after reading out of memory 201 the thermally induced displacement $\Delta Z_{i+1}$ at the current time $t_{i+1}$, performs the operation specified by Eq. 2 using said elongation $\Delta Z_{i+1}$ at time $t_{i+1}$ and the elongation $\Delta Z_i$ at the earlier time (by $\Delta t$) $t_i$, thereby deriving the elongation $dZ_{i+1}$ from time $t_i$ to time $t_{i+1}$, the signal indicative of $dZ_{i+1}$ being delivered to the arithmetic circuit 107.

It should be noted that performing the operation specified by Eq. 2 can be dispensed with if the spindle elongation from time $t_i$ to the points in time $t_{i+1}$ ($i=0, 1, 2, \ldots$) is stored in the memory 201.

In accordance with the present invention as described above, highly precise machining is made possible since the positional error along the Z-axis can be compensated to offset the positional displacement due to the heat generated in the spindle.

In the foregoing description the elongation versus time characteristic is approximated by a single straight line. However, it is possible to approximate the curve by a plurality of straight lines, and to establish parameters based on the data for each straight line. Furthermore, it has been described that the operations defined by equations 1 and 2 are performed at time intervals $\Delta t$. There are cases, however, where a considerable amount of time is required until the numerical control unit issues a command for movement along the Z-axis. In such cases the operations defined by Eqs. 1 and 2 may be performed n-number of times. When such is the case it is possible to so adapt the arithmetic circuit 107 as to perform the operation $$DZ = \Sigma dZ_{i+1} \quad (3)$$

and, when the command for movement along the Z-axis is issued, to perform the operation $z_c - DZ$ or $Z_c + DZ$ in accordance with the logic level ("1" or "0") indicated by the direction signal DS.

As many apparently widely different embodiments of the present invention can be made without departing from the spirit and scope thereof, it is to be understood that the invention is not limited to the specific embodiments thereof except as defined in the appended claims.

What we claim is:

1. A method of compensating for thermally induced displacement in a numerical control system for controlling a machine tool having a movable machine tool element, in response to numerical control data including a commanded amount of movement, to correct a positioning error caused by said thermally induced displacement in the positioning of said movable machine tool element, said method comprising the steps of:
    (a) measuring a maximum amount of thermally induced displacement, Lm, and the time, Tm, at which the displacement Lm occurs;
    (b) storing in memory, data indicating the maximum amount of thermally induced displacment, Lm, of the movable machine tool element, and data indicating the time, Tm, measured from the application of electric power to the machine tool;
    (c) measuring the time period from the application of electric power to the current time $t_{i+1}$;
    (d) compensating the commanded amount of movement of the movable machine tool element, in accordance with said stored data indicating the predetermined amount of thermally induced displacement, said compensation being in response to the movable machine tool element being positioned in accordance with the numerical control data; and
    (e) positioning the movable machine tool element in accordance with the compensated commanded amount of movement.

2. The method according to claim 1, wherein step (b) further comprises:
    storing data indicating a predetermined amount of thermally induced displacment of the movable machine tool element for each of a plurality of times measured from the application of electric power;
    reading the amount of thermally induced displacement at the current time $t_{i+1}$, out of the memory; and
    compensating the commanded amount of movement in accordance with said amount of thermally induced displacement read out of the memory.

3. The method according to claim 1, further comprising:
    computing the amount of thermally induced displacement $\Delta Z_{i+1}$ at the current time $t_{i+1}$, using the expression $\Delta Z_{i+1} = (Lm/Tm) \cdot t_{i+1}$;
    computing the amount of thermally induced displacement $dZ_{i+1}$ occurring during the period from a time $t_i$ prior to the current time, to the current time $t_{i+1}$, using the expression $\Delta Z_{i+1} - \Delta Z_i$, wherein $\Delta Z_i$ is the amount of thermally induced displacement at time $t_i$ and $\Delta Z_{i+1}$ is the amount of thermally induced displacement at said time $t_{i+1}$; and
    compensating the commanded amount of movement in accordance with said amount of thermally induced displacement $dZ_{i+1}$.

4. A method of compensating for thermally induced displacement in a numerical control system for controlling a machine tool having a spindle, to correct a positioning error caused by said thermally induced displacement of the spindle, the spindle being mounted for rotation in a headstock, an armature winding being wound on the spindle and a field winding being attached to the headstock, forming a spindle motor, and the spindle being positioned at a predetermined location by moving the headstock in response to numerical control data including a commanded amount of movement, said method comprising the steps of:
    (a) measuring a maximum amount of thermally induced displacement, Lm, and the time, Tm, at which the displacement Lm occurs;
    (b) storing in memory, data indicating the maximum amount of thermally induced displacement, Lm, of the spindle, and data indicating the time, Tm, measured from the application of electric power to the machine tool;
    (c) measuring the time period from the application of electric power, to the current time $t_{i+1}$;
    (d) compensating the commanded amount of movement of the spindle, in accordance with said stored time data and said stored data indicating the predetermined amount of thermally induced displacement, said compensating being in response to the spindle being positioned in accordance with the numerical control data; and
    (e) positioning the spindle in accordance with the compensated commanded amount of movement.

5. The method according to claim 4, wherein step (b) further comprises:
    storing data indicating a predetemined amount of thermally induced displacement of the spindle for each of a plurality of times measured from the application of electric power;
    reading the amount of thermally induced displacement at the current time $t_{i+1}$, out of memory; and
    compensating the commanded amount of movement in accordance with said amount of thermally induced displacement read out of the memory.

6. The method according to claim 4, further comrpising:
    computing the amount of thermally induced displacement $\Delta Z_{i+1}$ at the current time $t_{i+1}$, using the expression $\Delta Z_{i+1} = (Lm/Tm) \cdot t_{i+1}$
    computing the amount of thermally induced displacement $dZ_{i+1}$ occuring during the period from a time $t_i$, prior to the current time to the current time $t_{i+1}$, using the expression $dZ_{i+1} = \Delta Z_{i+1} - \Delta Z_i$, wherein $\Delta Z_i$ is the amount of thermally induced displacement at time $t_i$, and $\Delta Z_{i+1}$ is the amount of thermally induced displacement at said time $t_{i+1}$; and
    compensating the commanded amount of movement in accordance with said amount of thermally induced displacement $dZ_{i+1}$.

7. An apparatus for compensating for thermally induced displacement in a numerical control system for controlling a machine tool having a spindle, to correct a positioning error caused by said thermally induced displacement of the spindle, the spindle being mounted for rotation in a headstock, an armature winding being wound on the spindle and a field winding being attached to the headstock, forming a spindle motor, and the spindle being positioned at a predetermined location by moving the headstock in response to numerical control data indicating a commanded amount of movement, said apparatus comprising:

a memory for storing data indicating a maximum amount of thermally induced displacement of the spindle, Lm, and the time, Tm, measured from the application of electric power to the machine tool, at which the displacement Lm occurs;

a timer for measuring the time period from the application of electric power to the current time $t_{i+1}$;

compensation means, operatively connected to said memory and to said timer, for compensating the commanded amount of movement of the spindle in accordance with the data stored in said memory, and the current time $t_{i+1}$; and positioning means for positioning the spindle in accordance with the compensated commanded amount of movement.

8. The apparatus according to claim 7, wherein said memory further stores the amount of thermally induced displacement of the spindle at each of a plurality of points in time measured from the application of electric power to the machine tool; and wherein said compensation means includes:

means of reading the amount of thermally induced displacement stored in said memory corresponding to the current time $t_{i+1}$;

means for computing the amount of thermally induced displacement occuring during the period from time $t_i$ to time $t_{i+1}$; and arithmetic means for adjusting the commanded amount of movement in accordance with the direction of spindle movement and the computed amount of thermally induced displacement.

9. The apparatus according to claim 7, wherein said compensation means includes:

first arithmetic means for computing the amount of thermally induced displacement $\Delta Z_{i+1}$ at the time $t_{i+1}$ in accordance with the expression $\Delta Z_{i+1} = (Lm/Tm) \cdot t_{i+1}$, and for computing an amount of thermally induced displacement $dZ_{i+1}$ occuring during the period from a time $t_i$ prior to the current time to the current time $t_{i+1}$, in accordance with the expression $dZ_{i+1} = Z_{i+1} - Z_i$; and second arithmetic means for adjusting the commanded amount movement in accordance with the direction of the spindle movement and the computed amount of thermally induced displacement.

* * * * *

UNITED STATES PATENT AND TRADEMARK OFFICE
CERTIFICATE OF CORRECTION

PATENT NO. : 4,471,443
DATED : September 11, 1984
INVENTOR(S) : Kinoshita et al.

It is certified that error appears in the above-identified patent and that said Letters Patent is hereby corrected as shown below:

Column 1, line 12, "of" should be --or--.
Column 2, line 5, "x-axis" (second occurrence) should be --X-axis--.
Column 3, line 28, "Then, using the aforesaid value of $\Delta z_{i+1}$" should be a larger print style;

line 68, after "generating" insert --a--.
Column 5, line 10, "2c" (first occurrence) should be --Zc--.
Column 6, line 49, "comrpis-" should be --compris- --.
Column 8, line 19, "$t_{1+1}$" should be --$t_{i+1}$--.

Signed and Sealed this

Thirtieth Day of July 1985

[SEAL]

Attest:

DONALD J. QUIGG

Attesting Officer

Acting Commissioner of Patents and Trademarks